United States Patent [19]
Tayloe et al.

[11] Patent Number: 5,790,073
[45] Date of Patent: Aug. 4, 1998

[54] RADIO TELECOMMUNICATION NETWORK WITH FRAUD-CIRCUMVENTING REGISTRATION

[75] Inventors: Daniel Richard Tayloe, Phoenix; Dean Paul Vanden Heuvel, Chandler; Joseph Olk Lester; Scott David Blanchard, both of Mesa; Johanna Alexandra Wild, Scottsdale, all of Ariz.

[73] Assignee: Motorola, Inc., Schaumburg, Ill.

[21] Appl. No.: 627,218

[22] Filed: Mar. 13, 1996

[51] Int. Cl.$^6$ .................................................. G01S 5/02
[52] U.S. Cl. .................................................. 342/357
[58] Field of Search .................................... 342/357, 457, 342/450; 455/13.2, 12.1; 701/213

[56] References Cited

U.S. PATENT DOCUMENTS

| | | | |
|---|---|---|---|
| 5,343,512 | 8/1994 | Wang et al. | 379/59 |
| 5,365,451 | 11/1994 | Wang et al. | 364/449 |
| 5,412,388 | 5/1995 | Attwood | 342/357 |
| 5,412,389 | 5/1995 | Olds | 342/357 |
| 5,444,450 | 8/1995 | Olds et al. | 342/357 |
| 5,483,664 | 1/1996 | Moritz et al. | 455/13.1 |
| 5,500,648 | 3/1996 | Maine et al. | 342/357 |
| 5,515,062 | 5/1996 | Maine et al. | 342/457 |
| 5,523,997 | 6/1996 | Bishop | 370/54 |

*Primary Examiner*—Thomas H. Tarcza
*Assistant Examiner*—Dao L. Phan
*Attorney, Agent, or Firm*—Gregory J. Gorrie

[57] ABSTRACT

A system (28) provides communication services to mobile units (24). Mobile units (24) perform a unit-based location process (46, 48) to determine their locations. The system (28) performs a system-based location process (64, 66) to independently determine mobile unit locations. The system-based process may determine location less precisely than the unit-based process. A location selection process (104) evaluates the unit-determined location in view of a system-determined location error region to decide whether the unit-determined location is reliable. If the unit-determined location is reliable, it is used (120) to qualify communication services to be provided to the mobile unit (24). If the unit-determined location is unreliable, the system-based process is repeated (116) to improve the system-determined location precision, and the resulting system-determined location is used (118) to qualify communication services to be provided to the mobile unit (24).

22 Claims, 7 Drawing Sheets

RADIO TELECOMMUNICATION NETWORK WITH FRAUD-CIRCUMVENTING REGISTRATION

FIELD OF THE INVENTION

The present invention relates to radio telecommunications networks which selectively qualify mobile subscriber units to receive communication services based, at least in part, upon mobile unit location.

BACKGROUND OF THE INVENTION

A system portion of cellular or other radio telecommunication networks often needs to know the locations of the mobile subscriber units for which communication services are to be provided. For example, a system activates a ringing signal to alert a mobile unit to an incoming call. If the system knows the location of the mobile unit, then system resources can be conserved by activating the ringing signal in only the area where the mobile unit is located. System resources are conserved by refraining from activating the ringing signal in areas where the mobile unit is not located.

When the system uses satellite base stations placed in moving orbits around the earth, the need to know mobile unit locations becomes even greater. Satellites may have coverage areas that include geopolitical jurisdictions in which licenses to use the electromagnetic spectrum have not been obtained or are different from licenses for other jurisdictions. Accordingly, to comply with differing spectrum licensing requirements imposed by different geopolitical entities, the system may need to provide communication services on one side of a geopolitical border but not on the other side. This capability requires knowledge of mobile unit locations. In addition, power consumption is a critical concern for electrical equipment placed in satellites. Mobile unit location information allows a satellite to minimize the amount of power used to deliver a ringing signal to a targeted mobile unit.

The prior art discusses two mutually exclusive alternate techniques by which the system may learn of mobile unit locations. In one technique, the mobile unit determines its own location and sends the location information to the system during a registration process. The mobile unit may rely upon an independent location determination system, such as the Global Positioning System (GPS), in determining its location. In the alternate technique, the system determines the location of the mobile unit based upon communications conducted with the mobile unit. Doppler and propagation delay of communication signals are measured, and location is calculated in response to these measurements and in response to known satellite position data.

The system-determined location technique is desirable for security reasons. Since the system-determined location technique does not rely solely upon information provided by mobile units, the technique is not significantly vulnerable to fraud. In other words, mobile units cannot successfully provide fraudulent location information to gain system access which would otherwise be denied. Unfortunately, a satellite constellation's geometry which is optimized to provide communication services may not be optimized for making location calculations. Consequently, such location calculations tend to be imprecise unless they are based upon numerous time-consuming communication signal measurements. In addition, errors accrue in such calculations when mobile units are traveling at higher speeds, and acceptable location precision may not be achievable regardless of the number of signal measurements taken. Imprecise location information may force the system to improperly deny access to communication services, and the use of numerous signal measurements undesirably consumes system resources while degrading customer service by forcing users to wait for registration to take place.

The mobile unit-determined location technique is desirable because it conserves system resources and permits faster system access. Only one communication needs to take place between a mobile unit and the system. During this communication, the mobile unit informs the system of its location, and its location can often be determined accurately through the use of external location determination systems. System resources are conserved since only one communication takes place, and registration can occur quickly. Unfortunately, this technique leaves the system vulnerable to fraud.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE DRAWINGS

Figure 1:
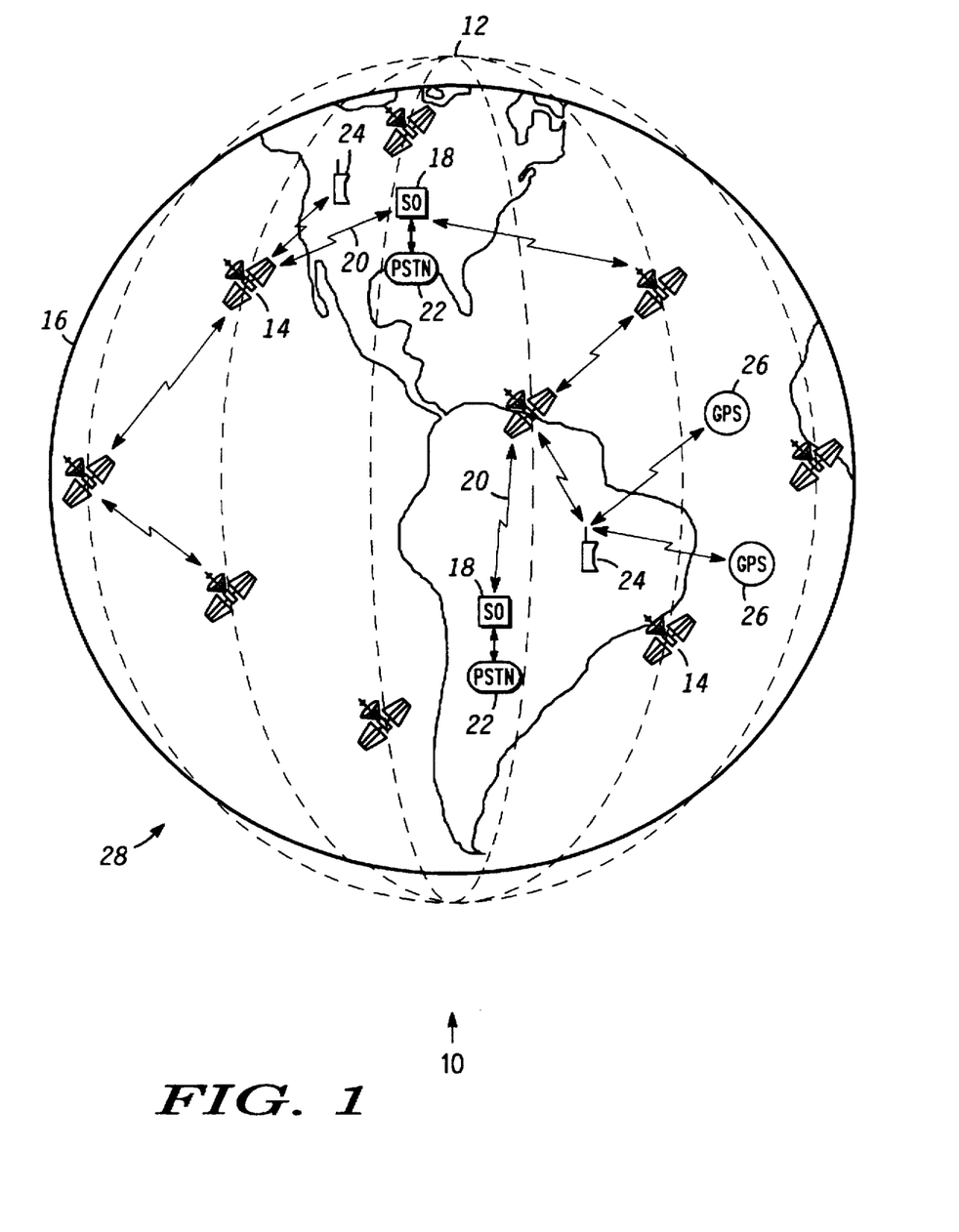
FIG. 1 shows a layout diagram of an environment within which a radio telecommunication network may operate.

FIG. 1 shows a layout diagram of a radio telecommunication network 10 configured in accordance with a preferred embodiment of the present invention. A constellation 12 consisting of several satellite nodes 14 is placed in a relatively low orbit around the earth 16.

One or more switching offices (SOs) 18 reside on the surface of the earth and are in data communication with nearby ones of satellite nodes 14 through RF communication links 20. SOs 18 couple to public switched telecommunication networks (PSTNS) 22, from which calls directed toward subscribers may be received and to which calls placed by subscribers may be sent.

Network 10 also includes any number, potentially in the millions, of subscriber units, hereinafter referred to as mobile units 24. Mobile units 24 may be configured as conventional mobile or portable radio communication equipment, but mobile units 24 may alternatively be configured as stationary equipment. Mobile units 24 are configured to receive communication from satellite nodes 14 and to perform other functions which are discussed below.

Mobile units 24 determine their own locations. In one embodiment of the present invention, mobile units 24 use a satellite positioning system 26, such as the Global Positioning System (GPS), in making this determination. Satellite positioning system 26 includes a constellation of transmitting satellites which orbit the earth and which continuously broadcast signals that may be monitored to determine the location of the monitoring point. However, the present invention is not limited to cooperation with the GPS system. In alternative embodiments, mobile units 24 may receive location information from on-board aircraft or ship navigation systems, from Loran-C, or from their own calculations based on monitoring transmissions from constellation 12 of satellite nodes 14.

Network 10 includes a communication system 28 through which mobile units 24 communicate. In other words, communication system 28 includes equipment provided by, maintained by, and under the control of a communication service provider. Communication system 28 is formed, at least in part, from constellation 12 of satellite nodes 14 and SOs 18. Satellite nodes 14 and SOs 18 are in data communication with one another, and many functions, such as location determination calculations, performed by communication system 28 may be performed at any node of communication system 28. Due to non-geostationary orbits, (e.g., low earth orbits), satellite nodes 14 constantly move relative to the earth. This movement is highly predictable. Thus, communication system 28 knows the locations of all satellites at any given point in time.

Figure 2:
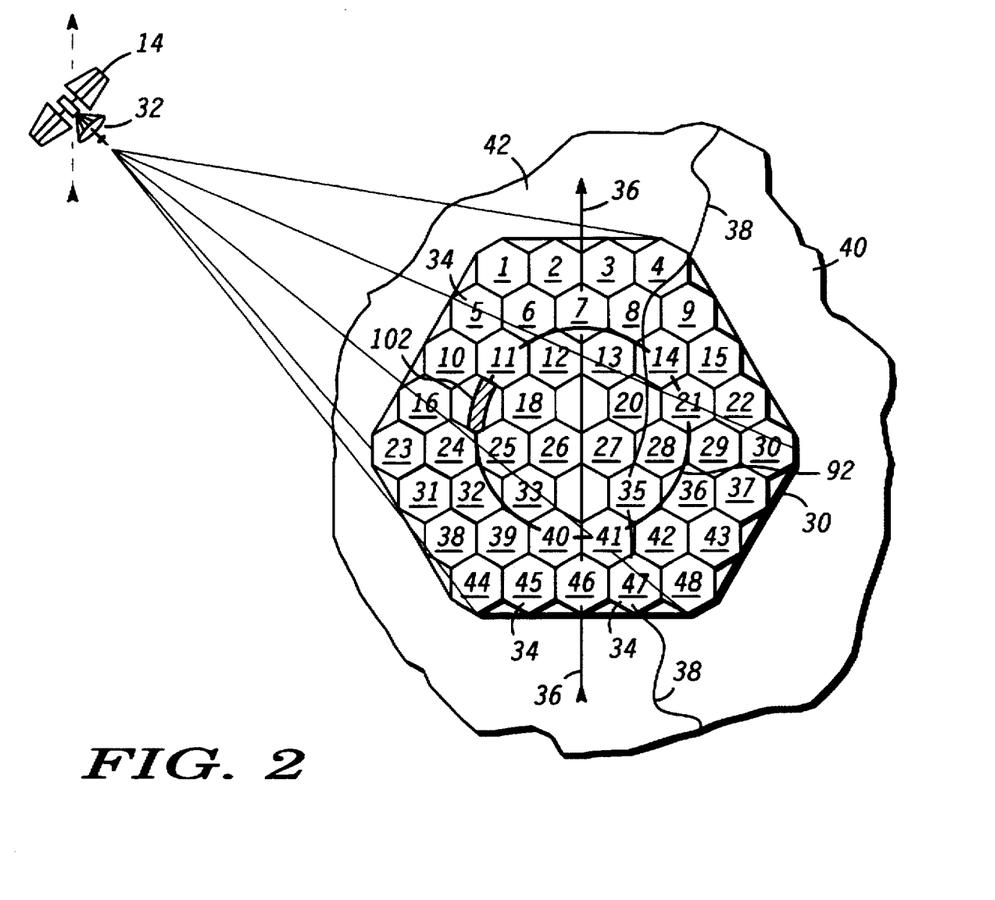
FIG. 2 shows a cellular pattern formed on the surface of the earth by a satellite portion of the network.

FIG. 2 shows a cellular footprint pattern 30 formed on the surface of the earth by a single satellite node 14. Each satellite node 14 includes an array 32 of directional antennas. Each array 32 projects numerous discrete antenna patterns on the earth's surface at numerous diverse angles away from its satellite node 14. FIG. 2 shows a diagram of a resulting pattern of cells 34 that a satellite node 14 forms on the surface of the earth. Desirably, other satellite nodes 14 (not shown) form other footprints (not shown) so that cells 34 substantially cover the entire surface of the earth.

For convenience, FIG. 2 illustrates cells 34 and footprint pattern 30 as being discrete, generally hexagonal shapes without overlap or gaps. However, those skilled in the art will understand that in actual practice equal strength lines projected from the antennas of satellite nodes 14 may actually have a shape far different than a hexagonal shape, that antenna side lobes may distort the pattern, that some cells 34 may cover larger areas than other cells 34, and that some overlap between adjacent cells may be expected.

Each cell 34 within footprint pattern 30 occupies a unique position within footprint pattern 30. These positions are distinguished from one another through the use of a cell ID, listed as 1 through 48 in FIG. 2. A degree of imprecise location information may be obtained by identifying a cell 34 that covers a position of interest. Such location information roughly defines a position relative to a satellite node 14. Since satellite nodes 14 orbit the earth in predictable orbits, a satellite's position at a particular point in time may be determined by combining the point in time with well known orbital geometry. By combining a cell's position within a footprint pattern 30 with the satellite's position, an imprecisely specified location on the earth may be obtained. However, a location specified in this matter may be accurate only within hundreds of kilometers. Accordingly, this location determination technique is too imprecise for use by communication system 28.

Each satellite node 14 is associated with a nadir direction. The nadir direction is defined by an imaginary line (not shown) extending from the satellite node 14 toward the center of the earth. For a given satellite node 14, a ground point resides where the nadir direction intersects the surface of the earth. As the satellite node 14 moves around the earth in its orbit, this ground point forms a satellite ground track 36.

On the surface of the earth, a boundary 38 separates a first jurisdiction 40 from a second jurisdiction 42. Any number of boundaries 38 may divide the entire earth's surface into any number of different jurisdictions. Boundaries 38 need not represent physical phenomena of the earth. Rather, boundaries 38 represent lines imposed over the geography of the earth to achieve some of the goals of network 10 (FIG. 1). Nothing prevents the existence of more than one set of boundaries corresponding to the same sections of the earth. Boundaries 38 may divide the earth into geopolitical jurisdictions, communication service rate jurisdictions, local area codes, and the like. Communication system 28 qualifies communication services provided to a mobile unit 24 in accordance with the one or more jurisdictions within which the mobile unit 24 resides. Accordingly, communication system 28 needs to know mobile unit locations with sufficient precision so that it will, to a degree of probability, accurately qualify communication services provided to mobile units 24.

Figure 3:
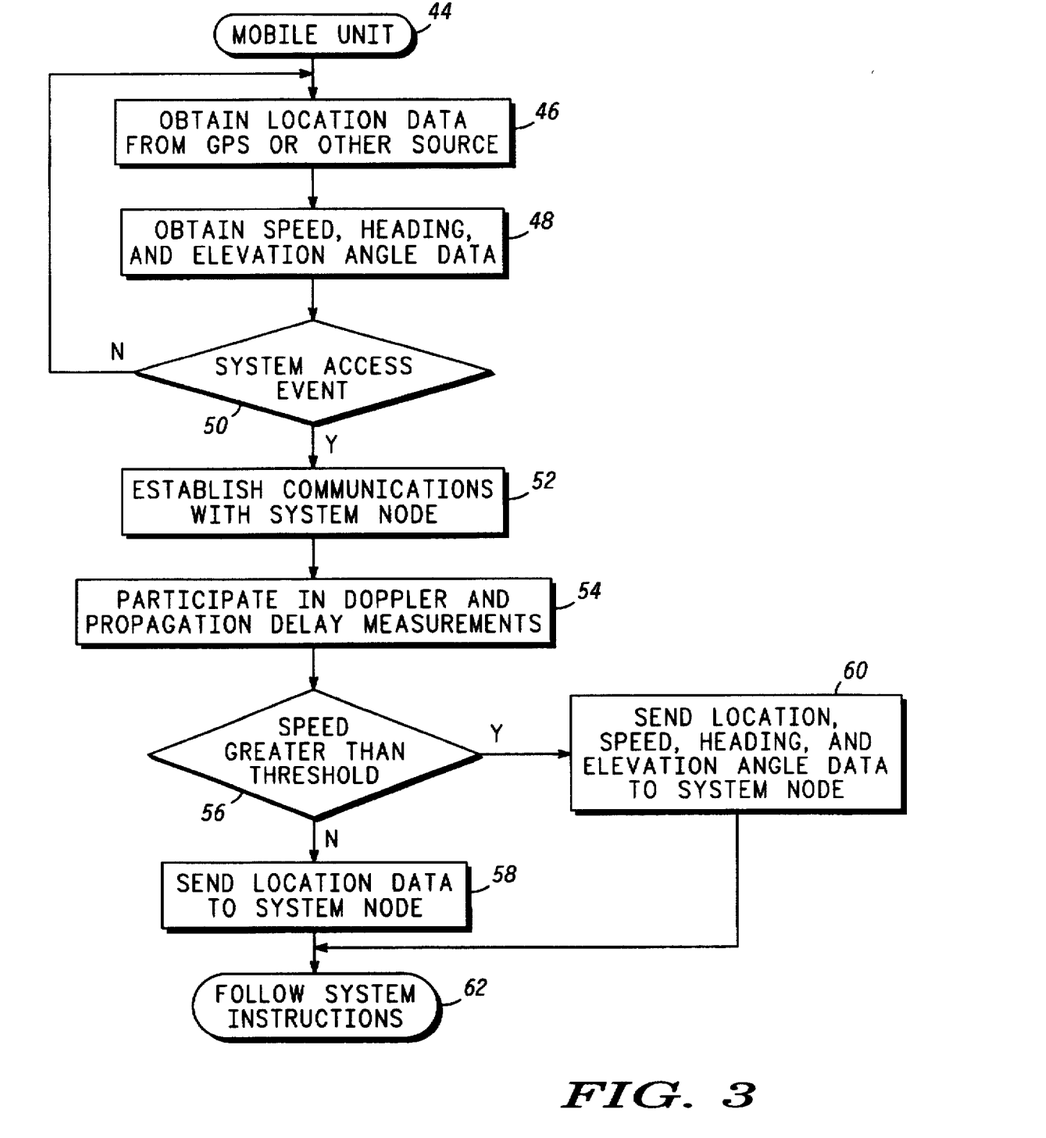
FIG. 3 shows a flow chart of a process performed by a mobile unit portion of the network.

FIG. 3 shows a flow chart of a process 44 performed by a mobile unit 24. Any number of mobile units 24 may individually perform process 44. In general, process 44 includes a location determination process which is performed outside communication system 28 (FIG. 1) along with tasks which cooperate with an independent location determination process performed by communication system 28.

In particular, process 44 includes a task 46 that obtains location data from a GPS receiver or other suitable source. The location described by these data is referred to herein as a unit-determined location or more simply as a unit location because it is determined at or near mobile unit 24. Other suitable sources may include aircraft navigation equipment, Loran-C, or a process which monitors signals broadcast by satellite nodes 14 to determine a location for mobile unit 24. Generally, GPS receivers and other sources of location data monitor signals broadcast from transmitters remotely located from mobile unit 24.

In addition, task 46 desirably obtains a definition for an error region to associate with the location data. The error region represents an area surrounding the reported unit location within which mobile unit 24 most probably resides. Different geometries of remote transmitters, different sources of location data, and other differences may lead to different error regions for different situations. However, many sources of location data resolve locations to relatively small error regions. For example, basic GPS receivers routinely provide location accuracy to within 0.1 kilometer.

In one embodiment, after task 46, task 48 obtains speed, heading, and elevation angle data for mobile unit 24. Speed, heading, and elevation angle data may be obtained directly from another source, such as a GPS receiver or aircraft navigation equipment, or may be calculated by monitoring changes in the unit location over time. In another embodiment of the present invention, task 48 is optional.

Next, a query task 50 determines whether a system or network access event has occurred. A system access event, for example, may cause mobile unit 24 to register or re-register with communication system 28. Registration allows communication system 28 to track the movement of mobile unit 24 so that ring signals which alert mobile unit 24 to incoming calls may desirably be broadcast in only the area where mobile unit 24 resides. In addition, registration allows communication system 28 to evaluate whether the current location of mobile unit 24 still entitles mobile unit 24 to receive communication services through communication system 28 for outgoing calls. Typical network and system access events include an attempt to make an outgoing call from mobile unit 24, moving mobile unit 24 a predetermined minimum distance away from the location at which mobile unit 24 last registered with communication system 28, the passage of a predetermined period of time since a previous registration, and the like.

If task 50 determines that no system access attempt or registration event has occurred, program flow loops back to task 46 to repeat the unit location determination process and track movement of mobile unit 24. As indicated by blocks in FIG. 3, any number of additional tasks may be included in the program flow loop that includes tasks 46, 48, and 50. For example, additional tasks may test for attempts to initiate incoming calls or outgoing calls.

If task 50 detects a system access attempt or registration event, a task 52 establishes communications with an overhead satellite node 14 (FIG. 1 and FIG. 2). Communications are established by exchanging RF signals between mobile unit 24 and node 14. After task 52, a task 54 causes mobile unit 24 to participate with the node 14 in measuring Doppler and signal propagation delay in these RF signals. Task 54 causes mobile unit 24 to participate in a system location determination process which is independent of the unit location determination process described above in connection with tasks 46 and 48. The system location determination process is discussed in more detail below.

Next, a query task 56 determines whether the speed of mobile unit 24 is greater than a predetermined threshold speed. As discussed below in more detail, the preferred system location process may be based, at least in part, upon Doppler in the RF signals exchanged between mobile unit 24 and node 14. Doppler is responsive to the relative velocity between node 14 and mobile unit 24. Accordingly, mobile unit speed causes a Doppler offset relative to the Doppler which would otherwise occur when mobile unit 24 is stationary, and this Doppler offset translates into location error. In a preferred system location process, location errors begin to become significant when mobile unit 24 travels at around 70 miles per hour, and become more significant the faster mobile unit 24 travels. Task 56 monitors speed data obtained above in task 48 to determine whether mobile unit 24 is moving faster than a predetermined threshold speed which may lead to unacceptable location determination error.

If task 56 determines that mobile unit 24 is moving below the threshold speed, a task 58 sends the location data obtained above in task 46 along with error region data to communication system 28. Thus, task 58 causes mobile unit 24 to communicate the unit location to communication system 28. In one embodiment of the present invention, if task 56 determines that mobile unit 24 is moving above the threshold speed, a task 60 sends the location data obtained above in task 46 along with error region data and the speed, heading, and elevation angle data obtained above in task 48 to node 14. After task 58 or 60, process 44 causes mobile unit 24 to follow system instructions, as indicated at a task 62. Such instructions may inform mobile unit 24 that a system access attempt has been accepted or denied, and mobile unit 24 will respond accordingly. Alternatively, such instructions may inform mobile unit 24 that additional location determination communications are required, and mobile unit 24 will repeat tasks 52 and 54 as needed.

In one alternative embodiment to the above-discussed version of process 44, tasks 48, 56, and 60 may be omitted for certain mobile units 24, particularly when such mobile units 24 are configured so that they are unlikely to travel at speeds in excess of the threshold speed discussed above in connection with task 56. In this situation, system-determined locations will not often be prone to significant errors due to mobile unit speed. In another alternative embodiment, tasks 56 and 58 may be omitted for mobile units 24 which are configured so that they are likely to travel at speeds in excess of the threshold speed. In this situation, system-determined locations will often be prone to errors caused by Doppler offsets.

Figure 4:
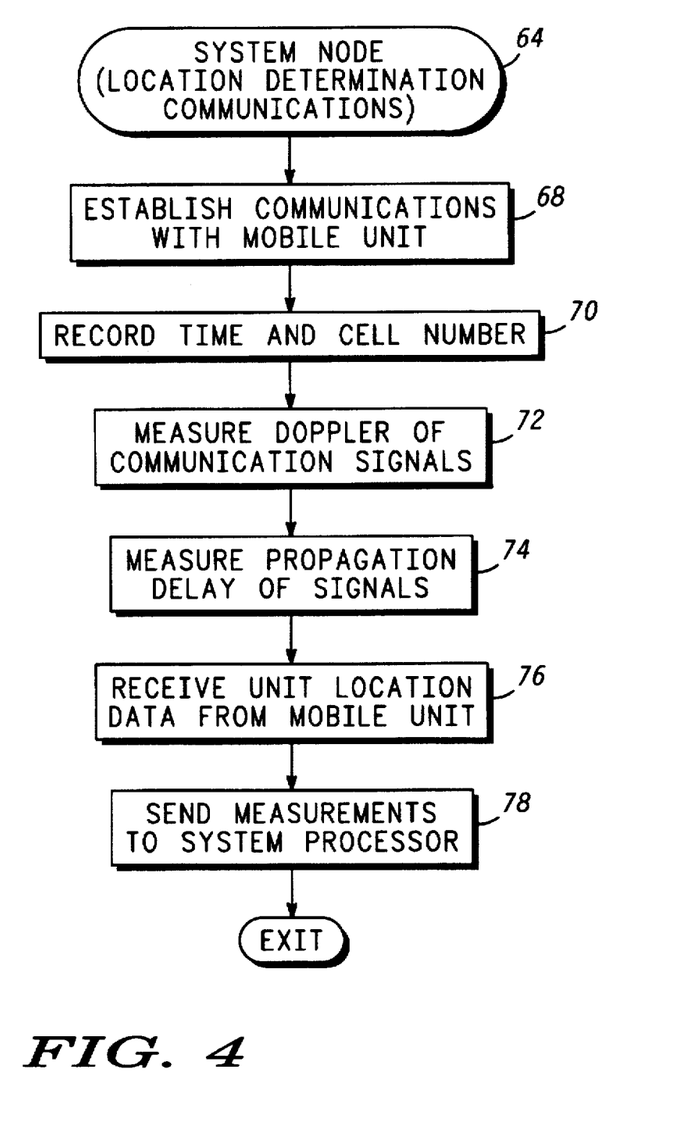
FIG. 4 shows a flow chart of a location determination communications process performed at a satellite node of the network.
Figure 5:
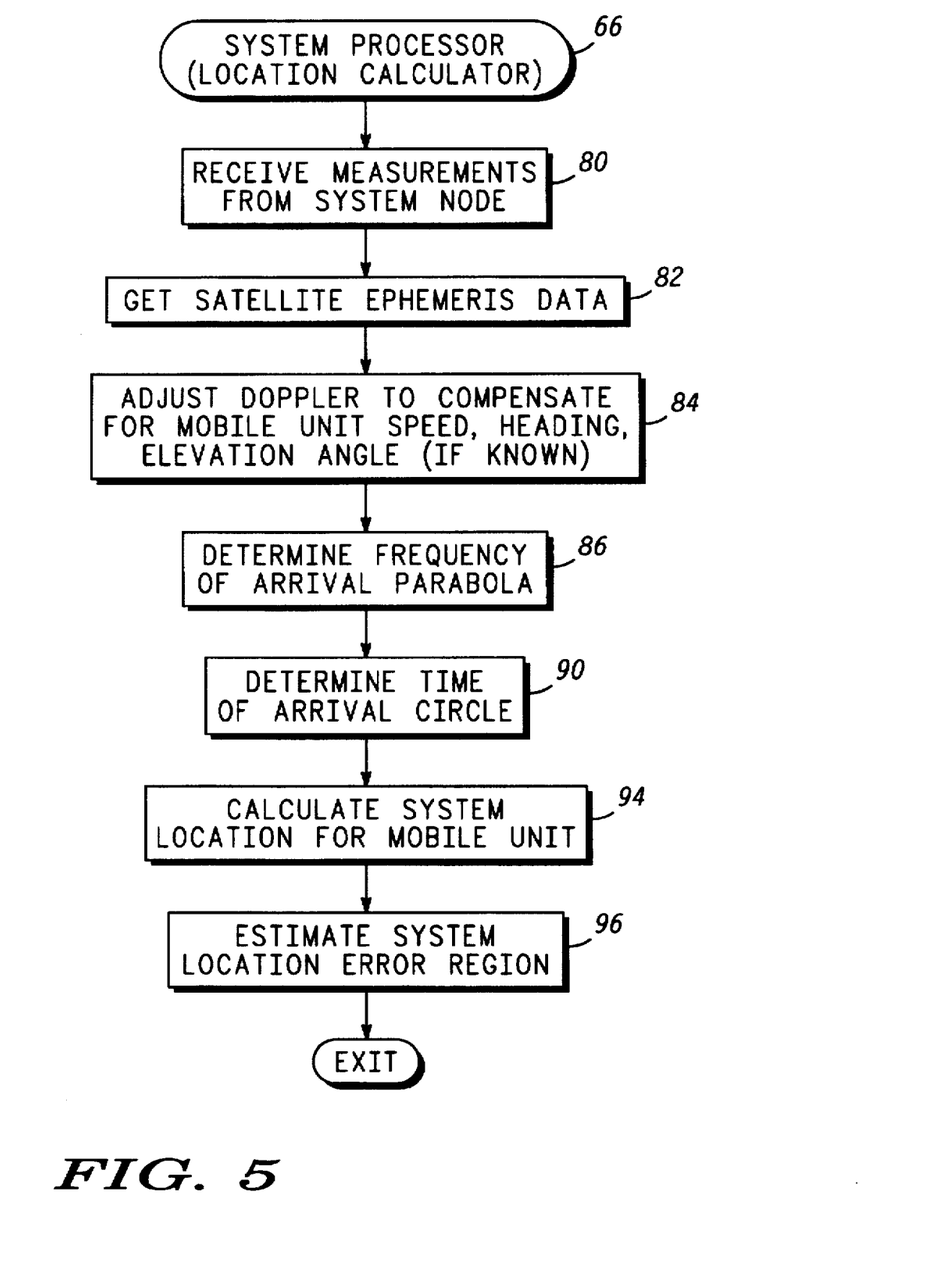
FIG. 5 shows a flow chart of a location calculator process performed at a system processor portion of the network.

FIG. 4 shows a flow chart of a location determination communications process 64 independently performed at satellite nodes 14. FIG. 5 shows a flow chart of a location calculator process 66 independently performed at system processors. The system processors may, for example, be located at SOs 18, but system processors may alternatively be located at node 14 or at any other node of communication system 28 which is in data communication with node 14. Generally, processes 64 and 66 together form the above-discussed system-determined location process which resolves the location of mobile unit 24 independently from the data collected in task 46 (FIG. 3).

Referring to FIG. 4, location determination communication process 64 may be performed whenever a mobile unit 24 initiates a communication with node 14, as discussed above in connection with tasks 50 and 52 (FIG. 3). Process 64 includes a task 68 which establishes communications with a mobile unit 24 by exchanging RF signals between node 14 and mobile unit 24. Next, a task 70 records a time stamp along with the ID of the cell 34 (FIG. 2) within which communication is taking place, and other identity information. The time stamp defines the point in time at which the location determination communications will occur. As discussed above, the cell ID may give an imprecise indication of location relative to node 14. Other information may include data which identify the particular node 14 engaging in the location determination communications.

After task 70, a task 72 measures the Doppler of the communication signals. This measurement may, for example, be made by first synchronizing a frequency base used in transmitting a signal from one of node 14 and mobile unit 24 and receiving the signal at the other of node 14 and mobile unit 24. The frequency of the received signal can then be measured to determine the frequency offset from a predetermined frequency. However, any alternate Doppler measurement technique known to those skilled in the art may be used as well.

Next, a task 74 measures propagation delay of the location determination signals. This measurement may be made by first synchronizing a time base used in mobile unit 24 to the time base of node 14, then transmitting a signal from one of node 14 and mobile unit 24 and receiving the signal at the other of node 14 and mobile unit 24. The received signal may then be measured to determine any temporal offset from a predetermined point in time. However, any alternate propagation delay measurement technique known to those skilled in the art may be used as well.

While node 14 performs tasks 70, 72, and 74, mobile unit 24 participates in the measurements as needed, as discussed above in connection with task 54 (FIG. 3). After task 74, a task 76 receives the unit-determined location data along with related data such as error region definition, speed, heading, and elevation angle, which were discussed above in connection with tasks 58 and 60 (FIG. 3). After task 76, a task 78 sends all measurements and location data collected during process 64 to the system processor which will calculate a system-determined location for mobile unit 24 and select an appropriate location to use as a basis for qualifying communication services to be delivered to mobile unit 24 by communication system 28.

Referring to FIG. 5, location calculator process 66, performed by the system processor, receives the measurements and location data at a task 80. In a task 82, process 66 gets satellite ephemeris data for the satellite node 14 taking the location determination measurements. Such data may be obtained by applying the time stamp and system node ID recorded above in task 70 (FIG. 4) to conventional orbital geometry to obtain coordinates for the satellite node 14 taking the location determination measurements. Such ephemeris calculations may be worked out prior to task 82 and saved in a table or other memory structure, or may be computed as needed.

After task 82, a task 84 adjusts the Doppler measurement taken above in task 72 (FIG. 4) to compensate for mobile unit speed, heading, and elevation angle. Of course, if speed, heading, and elevation angle are not known, then task 84 may be omitted. Likewise, Doppler adjustments may still be made if fewer than all of these parameters are known. Generally speaking, the speed, heading, and elevation angle parameters define a velocity vector which may be added to a velocity vector obtained from the ephemeris data obtained above in task 82 using vector addition.

After task 84, a task 86 identifies at least one frequency of arrival curve which fits the adjusted Doppler data. A given Doppler measurement can be reported from any point located on a curve geographically centered generally about satellite ground track 36 (FIG. 2) and extending away from the satellite node 14.

Figure 6:
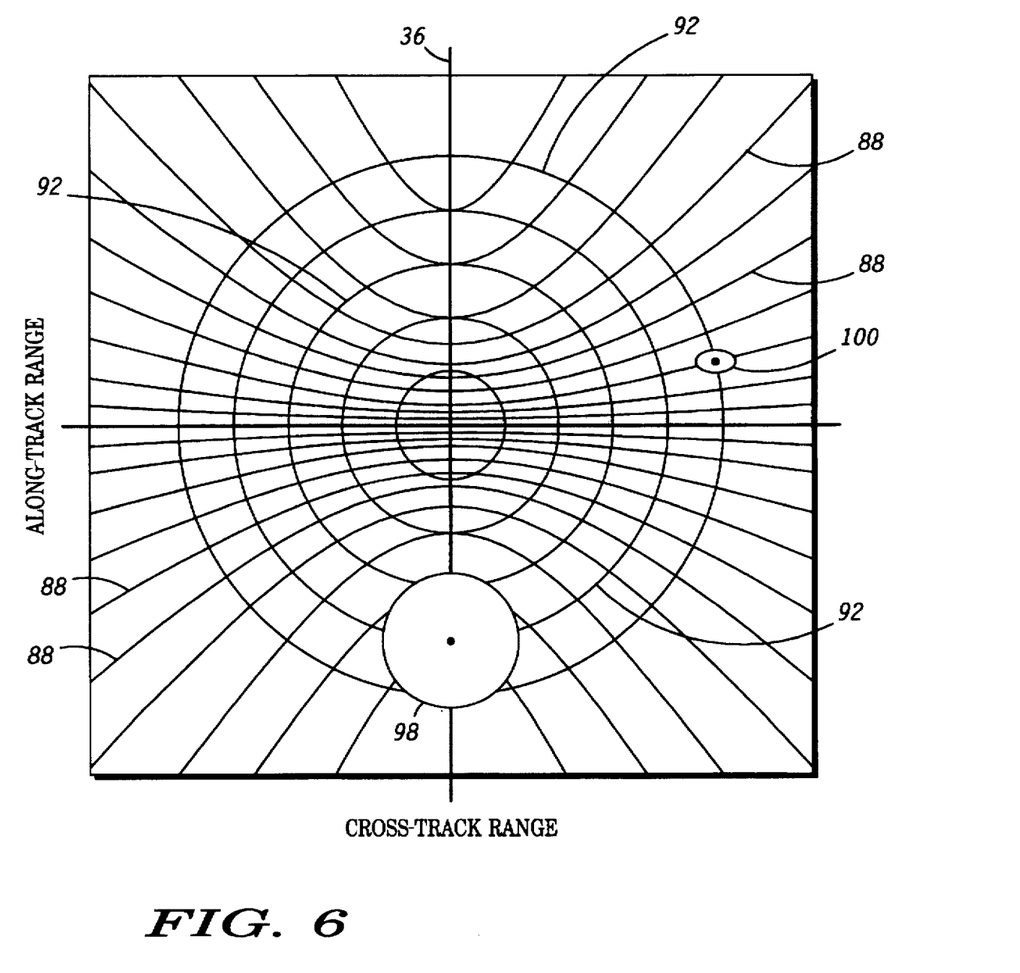
FIG. 6 graphically depicts constant Doppler and constant propagation duration curves which illustrate system location determination.

FIG. 6 graphically depicts constant Doppler curves 88. As shown in FIG. 6, a given Doppler component may be graphically plotted on the surface of the earth as a parabola generally centered along ground track 36. The given Doppler component extends away from a satellite node 14. Higher Doppler rates result in thinner parabola-like curves 88. At zero Doppler, which occurs when a satellite node 14 is directly overhead a mobile unit 24, the Doppler curve has an infinite width and resembles a straight line perpendicular to ground track 36. The frequency of arrival (FOA) parabola or curve determined in task 86 (FIG. 5) represents the curve 88 that describes the Doppler component indicated in the measurement record.

Referring back to FIG. 5, after task 86 determines the frequency of arrival curve on the surface of the earth, a task 90 determines a time of arrival circle which fits the propagation duration data measured above in task 74. Since electromagnetic signals propagate through the atmosphere at a constant velocity of approximately the speed of light, a given propagation duration dictates that the source of a signal responsible for the propagation duration must reside on the surface of a sphere having a radius approximately equal to the propagation duration times the speed of light and centered at the point where the signal is received. In the present invention, the source of an electromagnetic signal may be a mobile unit 24 residing on or near the surface of the earth and the signal may be received at a satellite node 14 orbiting the earth. Thus, a time of arrival circle represents the intersection of a sphere, centered at satellite node 14 and having a radius equivalent to the speed of light times the propagation duration, with the earth's surface.

FIG. 6 graphically depicts constant time of arrival (TOA) circles or curves 92. As shown in FIG. 6, a given propagation duration may be graphically plotted on the surface of the earth as a circle centered at the point on ground track 36 where the satellite's nadir direction intersects the surface of the earth. Longer propagation durations result in circles having larger radii. The TOA curve determined in task 90 (FIG. 5) represents the circle TOA curve 92 that describes the propagation duration indicated in the measurement record.

The intersection of FOA curve 88 determined in task 86 with the TOA curve 92 determined in task 90 provides a two-position solution to the location determination problem, as graphically illustrated in FIG. 6. One position from each two-position solution resides to the right of satellite ground track 36 and the other resides to the left of satellite ground track 36. Referring back to FIG. 5, after tasks 86 and 90 have determined frequency and time of arrival curves 88 and 92, a task 94 calculates a system-determined location for mobile unit 24 using FOA curve 88 and TOA curve 92. This system location is determined to be one of the two intersections of the FOA curve 88 with the TOA curve 92. The appropriate one of the two solutions may, for example, be determined by evaluating cell ID.

Next, a task 96 estimates a system location error region to be associated with the system location calculated above in task 94. As illustrated in FIG. 6, the error region depends in part upon the geometry of satellite node 14 and mobile unit 24 at the instant measurements are being made. A relatively large system location error region 98 results when mobile unit 24 resides near ground track 36. At such locations, FOA curves 88 become more tangential to TOA curves 92, and their intersection cannot be determined with precision. On the other hand, a relatively smaller system error region 100 results when mobile unit 24 resides farther away from ground track 36. At these locations, FOA curvess 88 become more perpendicular to TOA curves 92, and their intersection can be determined more precisely. Moreover, the error is typically greater in a direction perpendicular to ground track 36 than in a direction parallel to ground track 36. Together, these factors suggest that the system location probably does not describe the actual location for mobile unit 24, but that the actual location resides somewhere within system location error region 98 or 100.

Referring back to FIG. 5, program flow exits process 66 after task 96. A system location has been calculated independently of location data provided by mobile unit 24, and a system location error region has been calculated to go along with the system location.

FIG. 2 graphically illustrates an alternate embodiment to the version of location calculator process 66 specifically illustrated in FIG. 5. In this alternate embodiment, Doppler-related tasks, such as task 84 and 86 may be omitted while retaining propagation delay-related tasks, such as task 90. Tasks 94 and 96 calculate an intersection between the TOA curve 92 and a cell area corresponding to the cell ID. FIG. 2 graphically illustrates a system location error region 102 which represents a stripe through the cell, which is cell ID 17 in this example, where location determination communications with mobile unit 24 took place. The system location may be estimated to be midway between cell boundaries within region 102. While this alternative embodiment may not yield system location error regions as small as are obtained using Doppler calculations, it is not sensitive to Doppler offset errors caused by mobile unit speed. Accordingly, there is improved fraud detection performance when compared to the use of the beam footprint.

Figure 7:
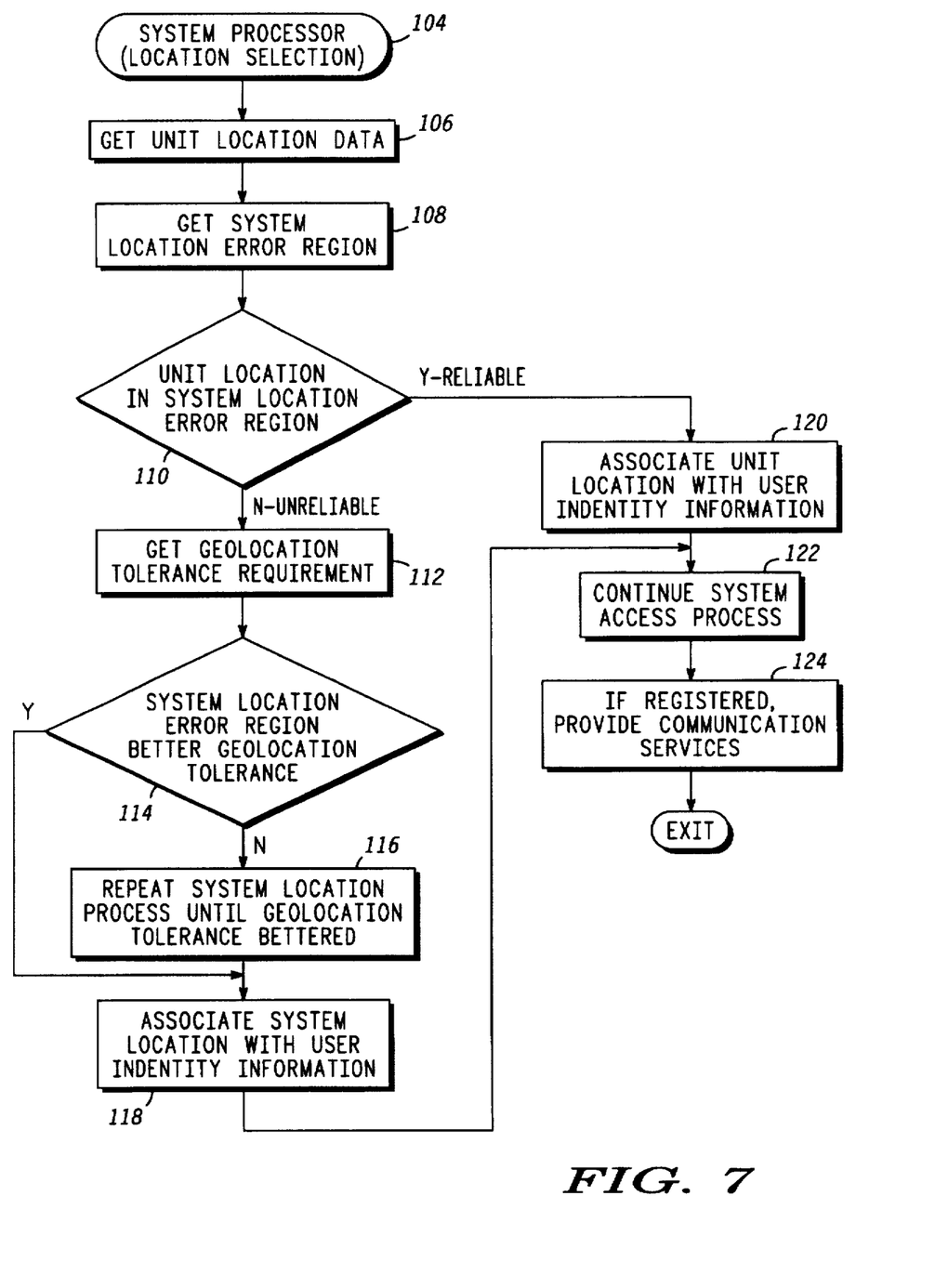
FIG. 7 shows a flow chart of a location selection process performed at the system processor portion of the network.

FIG. 7 shows a flow chart of a location selection process 104 desirably performed at the same system processor which performs location calculator process 66 (FIG. 5). Generally, process 104 determines whether the unit location is reliable and provides an appropriate geolocation parameter upon which communication system 28 may base communication service qualifications whether or not the unit location is reliable.

Process 104 includes a task 106 which gets the unit-determined location data discussed above in connection with FIG. 3. Next, a task 108 gets the system location error region 98, 100, or 102 determined above in connection with task 96 (FIGS. 2, 5, and 6). After task 108, a query task 110 determines whether the unit location is reliable in view of the system location error region. In particular, task 110 may decide whether the unit-determined location resides within the system-determined location error region. If the unit location resides within the system location error region, then the unit location is judged to be reliable.

If task 110 decides that the unit location is unreliable, communication system 28 attempts to obtain location data which are sufficiently accurate for the qualification of communication services. Service is not necessarily denied if a mobile unit 24 provides fraudulent, inaccurate, or otherwise unreliable location data. Rather, communication system 28 attempts to obtain reliable and sufficiently accurate data. Accordingly, attempts at location fraud are circumvented rather than being ignored or being merely identified. The system-determined location is assumed to be reliable because its calculation is more under the control of communication system 28. However, the system-determined location typically has a much larger error region associated with it than the unit-determined location, particularly if the unit location has been determined using satellite positioning system 26 (FIG. 1).

Process 104 performs a task 112 when the unit location is unreliable. Task 112 gets a geolocation tolerance requirement. In the preferred embodiment, this requirement may vary depending upon a crude location analysis, such as may be provided by the system location. When a mobile unit 24 may reside near a border or boundary 38 (FIG. 2) and communication services are to be qualified differently on different sides of the boundary 38, then a tighter geolocation tolerance may be required. On the other hand, if a mobile unit 24 appears to reside a long distance away from any border or boundary 38, then a wider geolocation tolerance may be tolerated. An appropriate tolerance may be obtained from a table in response to the system-determined location.

After task 112, a query task 114 determines whether the system-determined location error region betters the geolocation tolerance obtained in task 112. In other words, task 114 determines whether the actual location of mobile unit 24 most probably resides within an error region defined by the geolocation tolerance. If task 114 determines that the system location error region fails to better the geolocation tolerance, then a task 116 repeats the system location process (processes 64 and 66 combined, FIGS. 4 and 5) to gather more data on which to base location calculations and thereby shrink the system location error region. Conventional averaging and curve-fitting techniques may be used to combine the additional data. Task 116 may achieve its goal in the preferred embodiment within four iterations of the system location process. Repetitions of processes 64 and 66 cause additional location determination communications to be conducted between node 14 and mobile unit 24.

After task 116 and when task 114 determines that system error location betters geolocation tolerance on the first iteration of the system location process, a task 118 is performed. Task 118 associates the system-determined location with user identity information within communication system 28. As a consequence, communication services offered to mobile unit 24 will be qualified in response to the system-determined geolocation information.

As indicated in connection with task 110, when the unit-determined location is judged to be reliable, a task 120 associates the unit-determined location with user identity information within communication system 28. As a consequence, communication services offered to mobile unit 24 will be qualified in response to the unit-determined geolocation information. System resources may be consumed at a minimum rate due to the ability to rely upon user-provided location data. Moreover, system access time will be kept to a minimum due to reliance upon a single session of location determination communication.

The program flow from task 110 to task 120 in FIG. 7 assumes that the user-determined location has an error region associated therewith which is sufficiently small to meet the tightest geolocation tolerances imposed by communication system 28. This is a typical situation, particularly when satellite positioning system 26 (FIG. 1) is used in the unit location process. However, if another unit location process produces worse error regions, then a process similar to tasks 114 and 116 may be included to achieve acceptably accurate location data.

After task 118 or 120 assigns the appropriate location value for use as system geolocation information, a task 122 continues the system access process. Task 122 may grant or deny service based upon the system geolocation information. After task 122, a task 124 may continue to provide communication services if system access occurred above in task 120. Communication services may be provided by establishing incoming or outgoing calls to mobile unit 24. After task 124, program flow exits process 104.

In summary, the present invention provides an improved radio telecommunication network with fraud circumvention registration. The location determining process taught herein achieves the desirable attributes of unit-based location determination without making the system vulnerable to fraudulent location information. Accurate location information is obtained through a fast location determining and registration process which consumes a minimum of system resources. The location determining and registration process verifies the reliability of unit-provided location data before relying on the location data. The location determining and registration process also uses a system-based location determination process as a backup to the unit-based location determination process so that access is permitted in spite of unreliable user-provided location information. Further, the location determining and registration process uses a less precise system-based location determination process to judge the reliability of location information provided from a typically more precise unit-based location determination process. In addition, the location determining and registration process compensates for inaccuracies caused by mobile units moving at high speeds.

The present invention has been described above with reference to preferred embodiments. However, those skilled in the art will recognize that changes and modifications may be made in these preferred embodiments without departing from the scope of the present invention. For example, the network with which the present invention is used need not be global in scope and need not incorporate satellite system nodes. Moreover, those skilled in the art will appreciate that the processes and tasks identified herein may be categorized and organized differently than described herein while achieving equivalent results. These and other changes and modifications which are obvious to those skilled in the art are intended to be included within the scope of the present invention.

What is claimed is:

1. In connection with a radio telecommunication system that has a satellite node and which provides communication services to mobile units, a method of qualifying a mobile unit to utilize said communication services, said method comprising the steps of:

performing, by said mobile unit, a first location process to determine a first location for said mobile unit;

said mobile unit communicating said first location to said system;

said radio telecommunication system performing a second location process in response to communications conducted between said mobile unit and said satellite node, said second location process determining a second location for said mobile unit, said second location having a second location error region; and said radio telecommunication system deciding whether said first location is reliable in response to said second location error region by determining whether said first location resides within said second location error region, and when the first location is not reliable, the method additionally includes the steps of:

repeating the step of said system performing the second location process until said second location is within a predetermined geolocation tolerance for said second location; and granting system access to said mobile unit based on said second location, and when said first location is reliable, the method additionally includes the step of granting system access to said mobile unit based on said first location.

2. A method as claimed in claim 1 additionally comprising the step of configuring said first and second location processes so that said first location has a first location error region associated therewith, and said first location error region is smaller than said second location error region.

3. A method as claimed in claim 1 wherein:

prior to providing communication services to said mobile unit, said system associates mobile unit geolocation information with user identity information; and said method additionally comprises the step of using said first location for said mobile unit geolocation information when said deciding step decides that said first location is reliable.

4. A method as claimed in claim 1 wherein:

prior to granting access to said mobile unit, said system associates mobile unit geolocation information with user identity information; and said method additionally comprises the step of determining, when said deciding step decides that said first location is unreliable, whether said second location error region betters said predetermined geolocation tolerance.

5. A method as claimed in claim 4 wherein:

said second location process additionally determines a second location for said mobile unit; and said method additionally comprises the step of using said second location for said mobile unit geolocation information when said determining step determines that said first location is unreliable and that said second location error region betters said predetermined geolocation tolerance.

6. A method as claimed in claim 4 additionally comprising the step of conducting additional location-determination communications between said satellite node and said mobile unit when said determining step determines that said first location is unreliable and that said second location error region does not better said predetermined geolocation tolerance.

7. A method as claimed in claim 1 wherein:

said system projects a plurality of communication cells over diverse predetermined areas of the earth and each communication cell has a unique identity;

said mobile unit is located in one of said communication cells;

said second location process identifies a time of arrival curve in response to signal propagation delay between said mobile unit and said satellite node and identifies said one communication cell; and said second location process defines said second location error region to reside along an area defined as the intersection between said one communication cell and said time of arrival curve.

8. A method as claimed in claim 1 wherein said satellite node moves in an orbit around the earth, and said second location process comprises the steps of:

identifying a time of arrival curve relative to a position for said satellite node in response to signal propagation delay between said mobile unit and said satellite node;

identifying a frequency of arrival curve relative to said position for said satellite node in response to Doppler between said mobile unit and said satellite node; and defining said second location error region to reside in an area located at the intersection of said time of arrival and frequency of arrival curves.

9. A method as claimed in claim 1 wherein:

said method additionally comprises the step of determining, outside said system, speed data for said mobile unit;

said method additionally comprises the step of sending said speed data to said system;

said satellite node moves in an orbit around the earth; and said second location process determines said second location error region in response to Doppler detected in said communications conducted between said mobile unit and said satellite node and adjusted in response to said speed data.

10. A method as claimed in claim 9 additionally comprising the step of refraining from communicating said speed data to said system unless said speed data indicates a speed greater than a predetermined speed.

11. A method as claimed in claim 9 wherein:

said determining step additionally determines a heading for said mobile unit;

said sending step additionally sends said heading to said system; and said second location process additionally adjusts said Doppler in response to said heading.

12. A method as claimed in claim 11 wherein:

said determining step additionally determines an elevation angle for said mobile unit;

said sending step additionally sends said elevation angle to said system; and said second location process additionally adjusts said Doppler in response to said elevation angle.

13. A method as claimed in claim 1 wherein said first location process comprises the step of monitoring signals broadcast from a plurality of transmitters remotely located from said mobile unit.

14. In connection with a radio telecommunication system that has a satellite node and which provides communication services to mobile units, a method of qualifying a mobile unit to utilize said communication services, said method comprising the steps of:

performing a first location process to determine a first location for said mobile unit;

communicating said first location to said system;

performing a second location process in response to communications conducted between said mobile unit and said satellite node, said second location process determining a second location error region for said mobile unit;

deciding whether said first location is reliable in response to said second location error region;

configuring said first and second location processes so that said first location has a first location error region associated therewith, and said first location error region is smaller than said second location error region;

associating mobile unit geolocation information with user identity information prior to providing communication services to said mobile unit;

using said first location for said mobile unit geolocation information when said deciding step decides that said first location is reliable, said mobile unit geolocation information being better than a predetermined geolocation tolerance; and determining, when said deciding step decides that said first location is unreliable, whether said second location error region betters said predetermined geolocation tolerance.

15. A method as claimed in claim 14 wherein:

said second location process additionally determines a second location for said mobile unit, and said method additionally comprises the steps of:

using said second location for said mobile unit geolocation information when said determining step determines that said first location is unreliable and that said second location error region betters said predetermined geolocation tolerance; and conducting additional location-determination communications between said satellite node and said mobile unit when said determining step determines that said first location is unreliable and that said second location error region does not better said predetermined geolocation tolerance.

16. A method as claimed in claim 15 wherein:

said system projects a plurality of communication cells over diverse predetermined areas of the earth and each communication cell has a unique identity;

said mobile unit is located in one of said communication cells;

said second location process identifies a time of arrival curve in response to signal propagation delay between said mobile unit and said satellite node and identifies said one communication cell; and said second location process defines said second location error region to reside along an area defined as the intersection between said one communication cell and said time of arrival curve.

17. A telecommunication system which selectively provides communication services to a mobile unit, said system comprising:

a satellite node configured to engage in communications with said mobile unit; and a system processor in data communication with said satellite node, said system processor being configured to obtain a first location for said mobile unit, said first location being determined by a first location process performed by said mobile unit, to perform a second location process to determine a second location having a second location error region, said second location process being performed by said system processor in response to said communications with said mobile unit, and to decide whether said first location is reliable in response to said second location error region, by determining whether said first location resides within said second location error region, and when the first location is not reliable, the system processor repeats the second location process until said second location is within a predetermined geolocation tolerance for said second location and grants system access to said mobile unit based on said second location, and when said first location is reliable, the system processor grants system access to said mobile unit based on said first location.

18. A system as claimed in claim 17 wherein said system processor is configured to decide whether said first location is reliable by determining whether said first location resides within said second location error region.

19. A system as claimed in claim 18 wherein said system processor is configured to perform said first and second location processes so that said first location has a first location error region associated therewith and said first location error region is smaller than said second location error region.

20. A system as claimed in claim 19 wherein said system processor is configured to:

associate said system associates mobile unit geolocation information with user identity information prior to providing communication services to said mobile unit;

use said first location for said mobile unit geolocation information when said system processor decides that said first location is reliable; and determine whether said second location error region betters said predetermined geolocation tolerance when said first location is unreliable.

21. A system as claimed in claim 20 wherein said system processor is configured to:

perform said second location process that additionally determines a second location for said mobile unit; and use said second location for said mobile unit geolocation information when it determines that said first location is unreliable and that said second location error region betters said predetermined geolocation tolerance.

22. A system as claimed in claim 21 wherein said system projects a plurality of communication cells over diverse predetermined areas of the earth and each communication cell has a unique identity, said mobile unit is located in one of said communication cells, and wherein said system processor is configured, as part of said second location process, to:

identify a time of arrival curve in response to signal propagation delay between said mobile unit and said satellite node and identify said one communication cell;

define said second location error region to reside along an area defined as the intersection between said one communication cell and said time of arrival curve;

identify a frequency of arrival curve relative to said position for said satellite node in response to Doppler between said mobile unit and said satellite node; and     define said second location error region to reside in an area located at the intersection of said time of arrival and frequency of arrival curves.

\* \* \* \* \*